United States Patent
Takahashi

(10) Patent No.: US 10,440,222 B2
(45) Date of Patent: Oct. 8, 2019

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Daiki Takahashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/819,077

(22) Filed: Nov. 21, 2017

(65) Prior Publication Data
US 2018/0146113 A1 May 24, 2018

(30) Foreign Application Priority Data
Nov. 24, 2016 (JP) .................... 2016-228397

(51) Int. Cl.
*H04N 1/327* (2006.01)
*H04N 1/00* (2006.01)
(Continued)

(52) U.S. Cl.
CPC ....... *H04N 1/32776* (2013.01); *G06F 3/1203* (2013.01); *G06F 3/1226* (2013.01);
(Continued)

(58) Field of Classification Search
CPC . H04N 1/32776; H04N 1/00416; H04W 4/80; H04W 8/005; H04W 88/06; G06F 3/1226; H04L 67/16; H04L 69/18
(Continued)

(56) References Cited

U.S. PATENT DOCUMENTS

| 2010/0062711 A1* | 3/2010 | Park | H04W 8/005 |
| | | | 455/41.2 |
| 2011/0099264 A1* | 4/2011 | Chapin | H04L 41/12 |
| | | | 709/224 |

(Continued)

FOREIGN PATENT DOCUMENTS

| DE | 02015006927 A1 | 12/2015 |
| EP | 3101874 A1 | 12/2016 |

(Continued)

*Primary Examiner* — Jamares Q Washington
(74) *Attorney, Agent, or Firm* — Canon U.S.A., Inc., IP Division

(57) ABSTRACT

A control method for an information processing apparatus, the control method comprising: receiving, from a first external apparatus which belongs to a different subnet of a network than the subnet of the information processing apparatus, specific information for discovering the first external apparatus using a first communication unit; accepting an instruction from a user for searching for external apparatuses; discovering, in response to accepting the instruction and receiving the specific information before accepting the instruction, one or a plurality of external apparatuses by using the specific information, wherein the discovered external apparatuses includes the first external apparatus; displaying a list of information related to the discovered external apparatus(es); and communicating, using a second communication unit, with a selected external apparatus that a user has selected from the list.

16 Claims, 12 Drawing Sheets

(51) Int. Cl.

| | |
|---|---|
| *H04N 1/32* | (2006.01) |
| *H04L 29/08* | (2006.01) |
| *G06F 3/12* | (2006.01) |
| *H04L 29/06* | (2006.01) |
| *H04W 4/80* | (2018.01) |
| *H04W 8/00* | (2009.01) |
| *H04W 88/06* | (2009.01) |
| *H04W 84/12* | (2009.01) |

(52) U.S. Cl.
CPC ............ *G06F 3/1292* (2013.01); *H04L 67/16* (2013.01); *H04L 69/18* (2013.01); *H04N 1/00307* (2013.01); *H04N 1/00416* (2013.01); *H04N 1/32122* (2013.01); *H04W 4/80* (2018.02); *H04N 2201/006* (2013.01); *H04N 2201/0055* (2013.01); *H04N 2201/0094* (2013.01); *H04N 2201/3208* (2013.01); *H04W 8/005* (2013.01); *H04W 84/12* (2013.01); *H04W 88/06* (2013.01)

(58) Field of Classification Search
USPC .............. 358/1.15; 709/249; 340/4.42, 12.3, 340/13.22, 13.24
See application file for complete search history.

(56) References Cited

U.S. PATENT DOCUMENTS

| | | | |
|---|---|---|---|
| 2012/0164947 A1* | 6/2012 | Kammer | ............... H04L 63/102 455/41.2 |
| 2012/0287460 A1 | 11/2012 | McMillin | |
| 2014/0378058 A1 | 12/2014 | Decuir | |
| 2015/0264514 A1 | 9/2015 | Qi | |
| 2016/0353233 A1* | 12/2016 | Yong | ..................... H04W 76/10 |

FOREIGN PATENT DOCUMENTS

| | | |
|---|---|---|
| JP | 2012-39416 A | 2/2012 |
| WO | 2015/092484 A1 | 6/2015 |
| WO | 2016/064408 A1 | 4/2016 |

\* cited by examiner

INFORMATION PROCESSING APPARATUS, STORAGE MEDIUM, AND CONTROL METHOD

BACKGROUND OF THE INVENTION

Field of the Invention

The present invention relates to an information processing apparatus, a storage medium, and a control method.

Description of the Related Art

An information processing apparatus that communicates with an external apparatus has been proposed. The above-described information processing apparatus executes processing for searching for a communication partner apparatus (apparatus that can be communicated with by the information processing apparatus) before a communication is started. Japanese Patent Laid-Open No. 2012-39416 describes an information processing apparatus that discovers an apparatus that can be communicated with by the information processing apparatus by a multicast search and a unicast search.

In general, the information processing apparatus can discover an apparatus that is outside of the subnet to which the information processing apparatus belongs by unicast search processing. However, to execute the unicast search processing, specific information (such as the IP address) of the search target is needed.

The information processing apparatus described in Japanese Patent Laid-Open No. 2012-39416 obtains specific information (IP address) used for the unicast search processing by multicast search processing. However, in general, the multicast search processing only allows the information processing apparatus to discover an apparatus inside the subnet to which the information processing apparatus belongs. Consequently, a problem with the information processing apparatus described in Japanese Patent Laid-Open No. 2012-39416 is that it can't discover an apparatus outside the subnet to which the information processing apparatus belongs, even by using unicast search processing.

SUMMARY OF THE INVENTION

In view of the above, the present invention provides an information processing apparatus that can discover an apparatus outside a subnet to which the information processing apparatus belongs.

To address the above-described issue, a control method according to an aspect of the present invention relates to a control method for an information processing apparatus including a first communication unit configured to execute a short-range wireless communication and a second communication unit that can perform a communication in a longer range than the short-range wireless communication and belonging to a predetermined network constituted by a plurality of subnets, the control method comprising:

receiving, from an external apparatus corresponding to an apparatus outside the information processing apparatus, specific information for specifying the external apparatus by the first communication unit;

accepting an instruction for searching for the external apparatus from a user;

executing, in a case where the instruction is accepted from the user, search processing for searching for one or a plurality of external apparatuses by using the specific information received before the instruction is accepted, wherein an external apparatus having transmitted the specific information and belonging to a subnet different from a subnet to which the information processing apparatus belongs among the plurality of subnets is discovered by the search processing;

displaying a list for displaying information related to one or a plurality of the external apparatuses including the external apparatus discovered by the search processing; and executing a communication with the external apparatus corresponding to information selected from the list by the second communication unit.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings. It is to be understood that configurations obtained by applying appropriate alterations and modifications to the following exemplary embodiments also fall within the scope of the present invention without departing from the gist of the invention on the basis of the ordinary knowledge of the person skilled in the art.

First Exemplary Embodiment

An information processing apparatus and a communication apparatus included in a communication system according to the present exemplary embodiment will be described. A smart phone is exemplified as the information processing apparatus according to the present exemplary embodiment, but the configuration is not limited to this, and various devices such as a mobile terminal, a laptop personal computer (PC), a tablet terminal, a personal digital assistant (PDA), and a digital camera can also be used as the information processing apparatus. A printer is exemplified as the communication apparatus according to the present exemplary embodiment, but the configuration is not limited to this, and other various devices that can perform a wireless communication with the information processing apparatus can also be used as the communication apparatus. For example, various printers such as an ink-jet printer, a full-color laser beam printer, a monochrome printer, and the like can be used as the communication apparatus. Not only the printers but also a copier, a facsimile device, a mobile terminal, a smart phone, a laptop PC, a tablet terminal, a PDA, a digital camera, a music reproduction device, a television set, and the like can be used as the communication apparatus. In addition, a multi-function peripheral having a plurality of functions such as a copying function, a FAX function, a printing function can be used as the communication apparatus.

Figure 1:
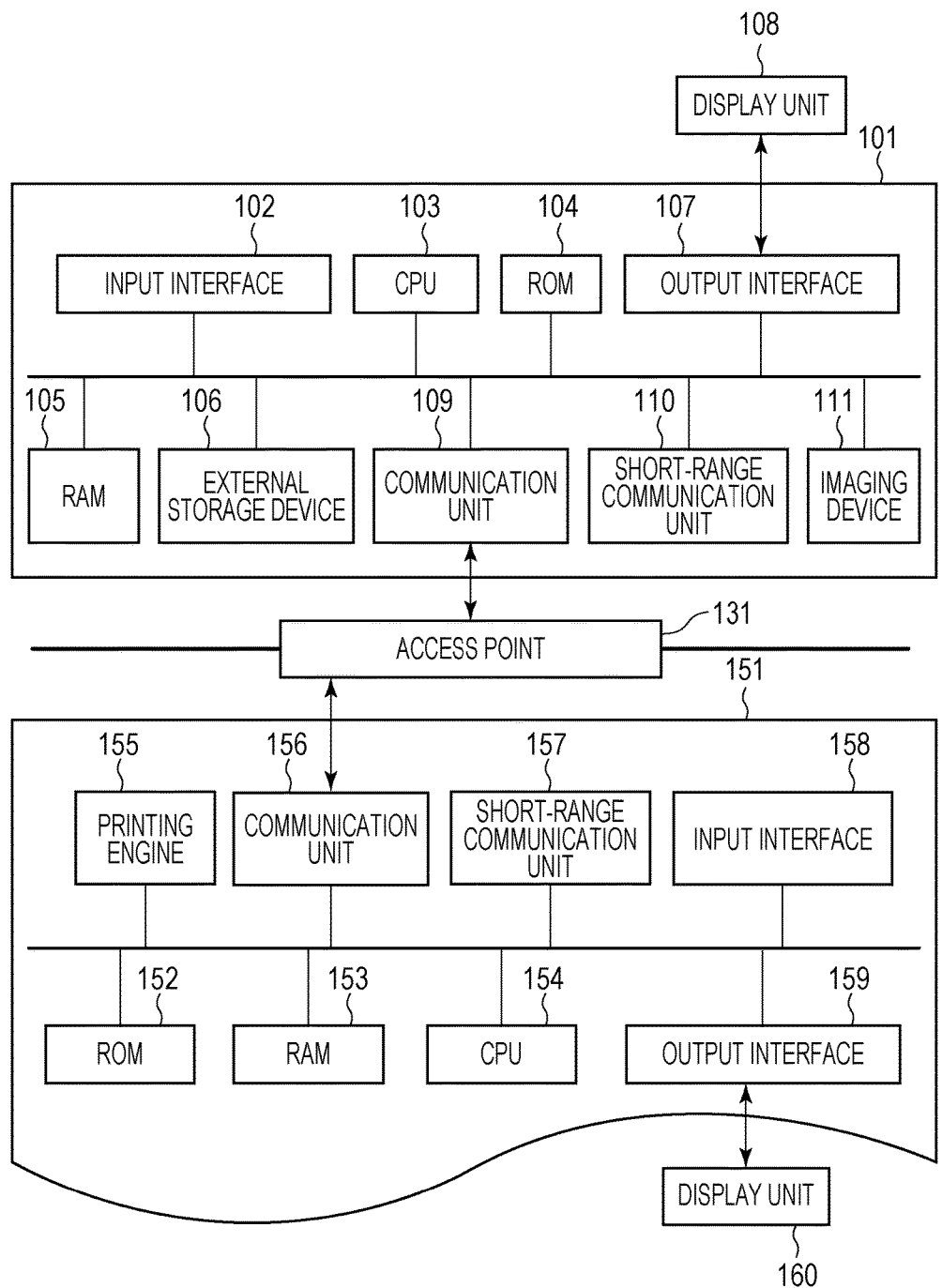
FIG. 1 illustrates hardware configuration units of an information processing apparatus and a communication apparatus.

First, hardware configuration units of the information processing apparatus (e.g. mobile terminal) according to the present exemplary embodiment and the communication apparatus according to the present exemplary embodiment will be described with reference to a block diagram of FIG. 1. The following configuration will be described as an example according to the present exemplary embodiment, but the exemplary embodiment can be applied to an apparatus that can perform a communication with the other apparatus, and the function and configuration are not particularly limited to FIG. 1. An information processing apparatus 101 is the information processing apparatus according to the present exemplary embodiment. The information processing apparatus 101 includes the hardware configuration unit including an input interface 102, a central processing unit (CPU) 103, a read-only memory (ROM) 104, random access memory (RAM) 105, an external storage device 106, an output interface 107, a display unit 108, a communication unit 109, a short-range communication unit 110, an imaging device 111, and the like.

The input interface 102 is an interface configured to accept a data input or an operation instruction from a user via a physical keyboard or button, a touch panel, or the like.

The CPU 103 is a system control unit configured to control the entirety of the information processing apparatus 101.

The ROM 104 stores fixed data such as control programs executed by the CPU 103, a data table, and an embedded operating system (hereinafter, which will be referred to as an OS) program. According to the present exemplary embodiment, software execution controls such as scheduling, task switching, and interruption processing are performed on the basis of the respective control programs stored in the ROM 104 under management of the embedded OS stored in the ROM 104.

The RAM 105 is constituted by a static random access memory (SRAM) that uses a backup power source or the like. It should be noted that the RAM 105 holds data by using a data backup primal battery which is not illustrated in the drawing, and therefore the RAM 105 can store important data such as program control variables without losing the data. A memory area for storing setting information of the information processing apparatus 101, management data of the information processing apparatus 101, and the like is also included in the RAM 105. The RAM 105 is also used as a main memory and a work memory of the CPU 103.

The external storage device 106 includes an application for providing a printing execution function. The external storage device 106 also includes various programs such as a printing information generation program for generating printing information that can be interpreted by a communication apparatus 151 and an information transmission and reception control program for transmitting and receiving information with the communication apparatus 151 connected via the communication unit 109. The external storage device 106 saves various information used by these programs. The external storage device 106 also saves image data obtained from the other information processing apparatus via the communication unit 109 or the internet.

The output interface 107 is an interface configured to perform control such that the display unit 108 displays data and performs notification of a state of the information processing apparatus 101.

The display unit 108 is constituted by a light emitting diode (LED), a liquid crystal display, or the like and performs data display and notification of the state of the information processing apparatus 101. It should be noted that the display unit 108 may be constituted by a touch panel. In this case, the information processing apparatus 101 may also accept an input from the user via the display unit 108 by displaying a soft keyboard including keys such as a numeric value input key, a mode setting key, an enter key, a cancel key, and a power key on the display unit 108.

The communication unit 109 has a configuration for executing a data communication while being connected to an apparatus such as the communication apparatus 151. For example, the communication unit 109 can be connected to an access point (not illustrated) in the communication apparatus 151. When the communication unit 109 and the access point in the communication apparatus 151 are connected to each other, the information processing apparatus 101 and the communication apparatus 151 can mutually perform the communication. It should be noted that the communication unit 109 may directly communicate with the communication apparatus 151 by way of the wireless communication. Additionally or alternatively, the communication unit 109 may communicate with the communication apparatus 151 via an external access point (access point 131) existing outside the information processing apparatus 101. A wireless communication method includes, for example, Wireless Fidelity (Wi-Fi®). The access point 131 includes, for example, a device such as a wireless LAN router. A method for the information processing apparatus 101 and the communication apparatus 151 to directly connect together without the intermediation of an external access point is referred to as a direct connection method according to the present exemplary embodiment. On the other hand, a method for the information processing apparatus 101 and the communication apparatus 151 to connect together via an external access point is referred to as an infrastructure connection method. The communication unit 109 may include hardware functioning as an access point and may also operate as an access point by using software for causing the communication unit 109 to function as the access point. According to the present exemplary embodiment, the communication unit 109 can perform long range communication at a higher speed than short-range communication (short-range wireless communication). The short-range communication may be executed by the short-range communication unit 110.

The short-range communication unit 110 is configured to wirelessly connect to an apparatus such as the communication apparatus 151. The wireless connection can be used to perform data communication with the connected apparatus. The data communication may be performed by using a communication method that is different to the method of communication used by the communication unit 109. The short-range communication unit 110 can be connected to a short-range communication unit 157 in the communication apparatus 151. It should be noted that the short-range communication unit 110 according to the present exemplary embodiment may use a Bluetooth® Low Energy standard to wirelessly communicate with an apparatus (e.g. communication apparatus 151). Hereinafter, Bluetooth Low Energy will be referred to as BLE. For this reason, the short-range communication unit 110 may communicate with the other short-range communication unit by way of a Generic Attribute Profile (GATT) communication defined by BLE standards. It should be noted that the communication method used by the short-range communication unit 110 is not limited to BLE. For example, other communication methods such as a near field communication (NFC) and Bluetooth® Classic may also be used.

The imaging device 111 is a device configured to convert an image captured by an imaging element into digital data. The digital data is stored in the RAM 105 once. Thereafter, the digital data is converted into a predetermined image format by the program executed by the CPU 154 and saved in the external storage device 106 as image data.

The communication apparatus 151 is the communication apparatus according to the present exemplary embodiment. The communication apparatus 151 includes a ROM 152, a RAM 153, a CPU 154, a printing engine 155, a communication unit 156, the short-range communication unit 157, an input interface 158, an output interface 159, a display unit 160, and the like.

The communication unit 156 may include an access point for connecting to an apparatus such as the information processing apparatus 101. It should be noted that this access point can be connected to the communication unit 109 of the information processing apparatus 101. In addition, the communication unit 156 may directly communicate with the information processing apparatus 101 by using wireless communication. Alternatively, the communication unit 156 may directly communicate with the information processing apparatus 101 via the access point 131. As mentioned previously, the wireless communication method includes, for example, Wi-Fi®. The communication unit 156 may include hardware functioning as an access point or it may operate as an access point by using software for causing the communication unit 156 to function as the access point.

The RAM 153 comprises a DRAM that uses a backup power source or the like. It should be noted that, since the RAM 153 holds the data on the basis of the supply from the data backup power source which is not illustrated in the drawing, the RAM 153 can store important data such as program control variables without losing the data. The RAM 153 is also used as a main memory and a work memory of the CPU 154. The RAM 153 saves a reception buffer for temporarily saving the printing information received from the information processing apparatus 101 or the like and various information.

The ROM 152 stores fixed data such as control programs executed by the CPU 151, a data table, and an OS program. According to the present exemplary embodiment, software execution controls such as scheduling, task switching, and interruption processing are performed on the basis of the respective control programs stored in the ROM 152 under management of the embedded OS stored in the ROM 152. The ROM 152 also includes a memory area for storing data such as setting information of the communication apparatus 151 and management data of the communication apparatus 151 that need to be stored even in a case where power is not supplied from the power source.

The CPU 154 is a system control unit and is configured to control the entirety of the communication apparatus 151.

The printing engine 155 (image forming unit) forms an image on a recording medium such as paper by using a recording material such as ink and outputs a printing result on the basis of the information saved in the RAM 153 or the printing information received from the information processing apparatus 101 or the like. At this time, the printing information transmitted from the information processing apparatus 101 or the like is received via the communication unit 156 (high-speed communication unit). The communication unit 156 can perform communication at a higher speed than the short-range communication unit 157. The higher speed makes it beneficial to use the communication unit 156 for receiving printing information, particularly as the amount of data in the printing information may be large and thereby demand a high-speed communication for quick printing.

The input interface 158 is an interface configured to accept data input or an operation instruction from the user. The input interface 158 may comprise a physical keyboard or button, a touch panel, or the like. It should be noted that a mode may be adopted in which the output interface 159 (which will be described below) and the input interface 158 have the same configuration, and the output of the screen and the acceptance of the operation from the user are performed by using the same configuration. The output interface 159 interfaces with the display unit 160 to perform data display and control to, for example, provide a notification of a state of the communication apparatus 151.

The display unit 160 is constituted by a light emitting diode (LED), a liquid crystal display, or the like. The display unit 160 is configured to display data and the notification of the state of the communication apparatus 151. It should be noted that an input from a user may be obtained via the display unit 160 by displaying a soft keyboard (i.e. virtual keyboard) which a user may use to input data or make a selection. The soft keyboard may include keys such as a numeric value input key, a mode setting key, an enter key, a cancel key, and a power key on the display unit 160.

Figure 2:
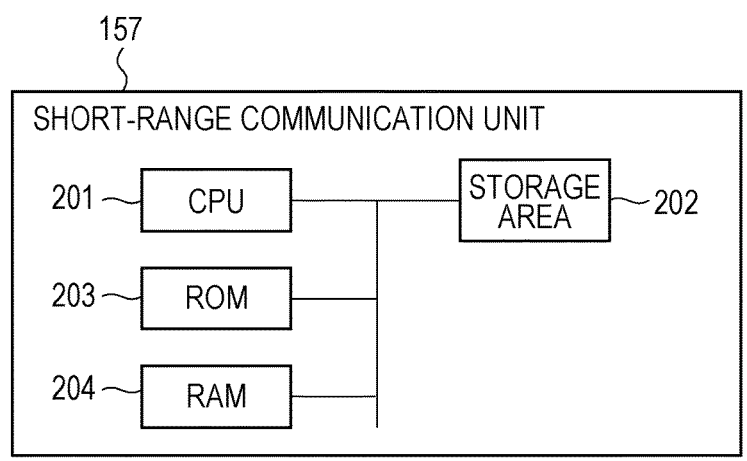
FIG. 2 illustrates a detail of a short-range communication unit included in the communication apparatus.

FIG. 2 provides a more detailed illustration of the short-range communication unit 157. The short-range communication unit 157 is configured to wirelessly communicate with an apparatus such as the information processing apparatus 101. According to the present exemplary embodiment, BLE is used as the wireless communication method of the short-range communication unit 157. Thus, it will be appreciated that the short-range communication unit 157 of the communication apparatus may communicate with a short-range communication unit of another apparatus (e.g. information processing apparatus 101 based on a GATT communication defined by the BLE standards. The short-range communication unit 157 and the CPU 154 perform a communication via a bus interface such as I2C. The short-range communication unit 157 includes a CPU 201, a storage area 202, a ROM 203, and a RAM 204. The storage area 202 includes a storage area where an access from the CPU 154 can be recorded. An access from the information processing apparatus 101 via the short-range communication unit 110 can also be recorded in the storage area 202. The RAM 204 comprises DRAM that uses a backup power source (not illustrated) or the like to hold data. Thus, the RAM 204 may hold important data such as program control variables without losing the data. The RAM 204 is also used as a main memory and a work memory of the CPU 201. The ROM 203 stores fixed data such as control programs executed by the CPU 201, a data table, and an OS program. It should be noted that the short-range communication unit 110 of the information processing apparatus 101 may also have the same or a similar configuration as that of the short-range communication unit 157 of the communication apparatus 151. A memory such as an external HDD or an SD card may be mounted to the communication apparatus 151 as an optional device, and the information saved in the communication apparatus 151 may be saved in the memory.

According to the present exemplary embodiment, the communication apparatus 151 operates as a peripheral apparatus, and the information processing apparatus 101 operates as a central apparatus. It should be noted that the communication apparatus 151 as the peripheral apparatus also operates as an advertiser configured to broadcast advertisement information which will be described below. The information processing apparatus 101 as the central apparatus also operates as an initiator configured to receive the advertisement information.

Herein, assignment (distribution) of processes for the information processing apparatus 101 and the communication apparatus 151 has been described above as an example, but the configuration is not limited to this assignment mode and may also adopt other modes.

Processes for the transmission of the advertisement information and the reception of the start request of the GATT communication based on the BLE standards will be described here. According to the present exemplary embodiment, the short-range communication unit 157 of the communication apparatus 151 operates as a slave device and performs the above-described processing.

Figure 6:
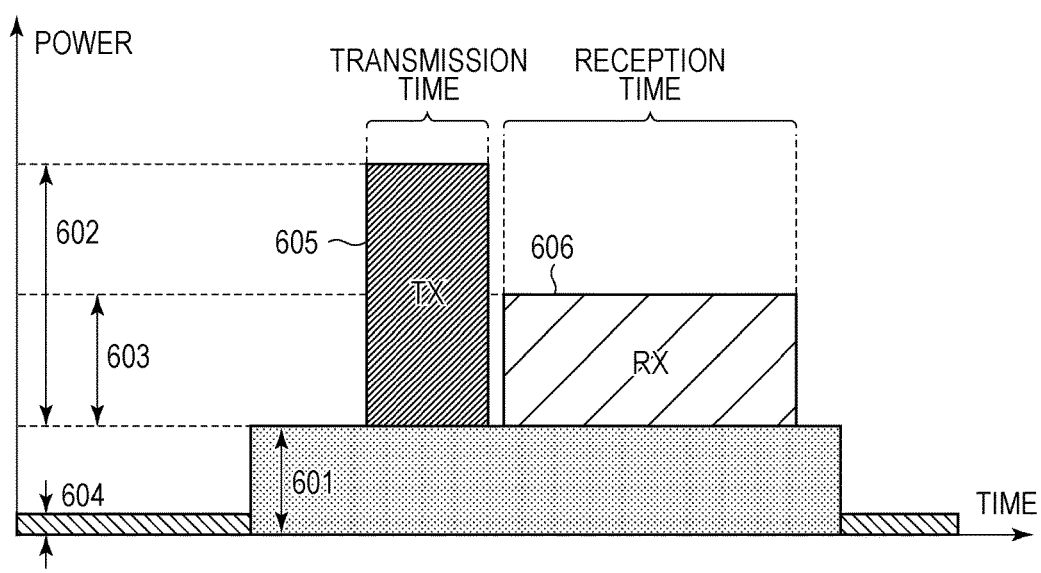
FIG. 6 illustrates the power consumption of the short-range communication unit.

The short-range communication unit 157 performs a communication by dividing a frequency band of 2.4 GHz into 40 channels (0 to 39 ch). The short-range communication unit 157 uses the 37th to 39th channels among the 40 channels for the transmission of the advertisement information and for the reception of a start request of a GATT communication. After a BLE connection is established, the short-range communication unit 157 uses the 0th to 36th channels for data communication (e.g. GATT communication). In FIG. 6, a vertical axis indicates power consumption of the short-range communication unit 157, and a horizontal axis indicates time. FIG. 6 illustrates power consumption of each process when the advertisement information is transmitted using a single channel. Tx 605 indicates the total power consumption in a transmission process for broadcasting the advertisement information. Rx 606 indicates the total power consumption in a reception process for enabling a reception device to receive the start request of the GATT communication. Transmission power 602 indicates the instantaneous power consumption in the transmission process. Reception power 603 indicates the instantaneous power consumption in the reception process. Microcomputer operation power 601 indicates the instantaneous power consumption when the microcomputer operates the short-range communication unit 157. It should be noted that a reason why the microcomputer operates before the Tx 605, after the Rx 606, and between the Tx 605 and the Rx 606 is that the microcomputer needs to be activated in advance for executing and stopping the transmission and reception processes. In cases where the transmission of the advertisement information is performed by using a plurality of channels, the power consumption is increased in accordance with the number of channels in which the transmission of the advertisement information is performed. Sleep power 604 indicates the instantaneous power consumption of the short-range communication unit 157 while the microcomputer does not operate and while the short-range communication unit 157 is in a power saving state. It should be noted that the sleep power 604 indicates the power consumed by the short-range communication unit 157 during the power saving time of FIG. 7 which will be described below. The short-range communication unit 157 waits for the transmission of the start request of the GATT communication from the information processing apparatus 101 by performing the reception processing for a certain period of time by using the a predetermined channel after the transmission processing is performed by using the predetermined channel.

Figure 7:
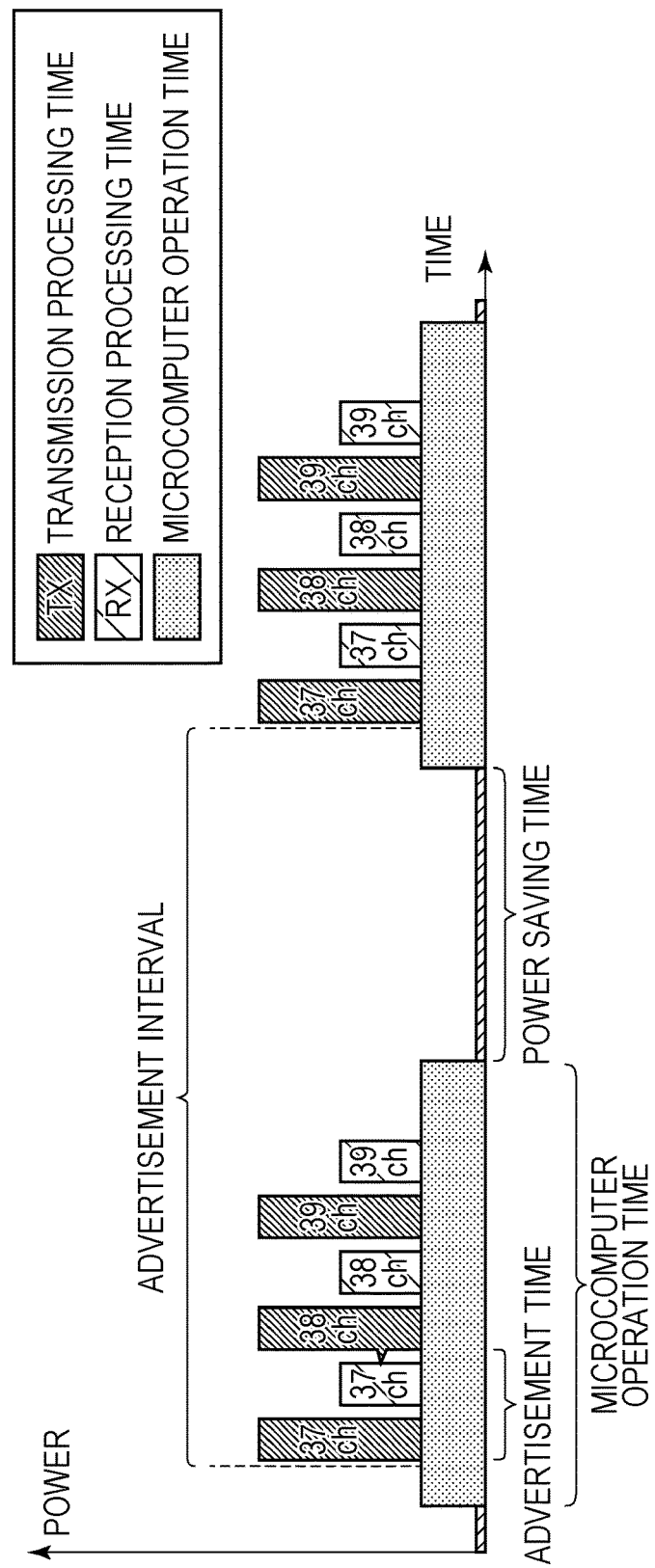
FIG. 7 illustrates transmission processing and reception processing of the advertisement information by the short-range communication unit.

As illustrated in FIG. 7, the short-range communication unit 157 repeats the transmission process and the reception process of the advertisement information three times, and thereafter, the operation of the microcomputer is stopped to enter the power saving state for a certain period of time. Hereinafter, the combination of transmitting advertisement information and receiving advertisement information over a predetermined channel will be referred to as an advertisement. The time interval between successive transmissions of advertisement information over the same channel (e.g. ch37 in FIG. 7) will be referred to as an advertisement interval. Thus, for example, FIG. 7 shows the advertisement interval between successive transmissions of advertisement information over channel 37. This advertisement starts from the beginning of the earliest transmission over channel 37 and ends at the beginning of the later transmission over channel 37. In this manner, by entering the short-range communication unit 157 to the power saving state for each advertisement interval, the short-range communication unit 157 can continue the operation with suppressing the power consumption. It should be noted that the number of times to repeat the advertisement until the power saving state is established after the first advertisement is performed can be arbitrarily changed as long as the number of times to repeat is three times or fewer.

Figure 5:
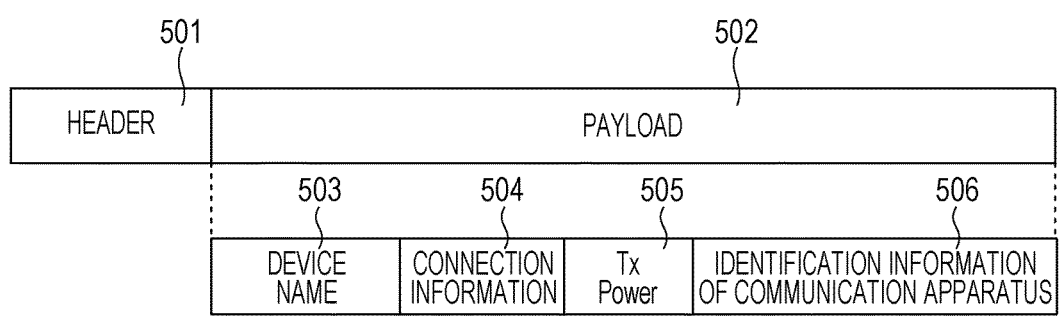
FIG. 5 illustrates an example of the structure of an advertisement information broadcast that may be sent to a periphery of the communication apparatus by the short-range communication unit.

FIG. 5 illustrates an example of the structure of the advertisement information that is broadcast by the short-range communication unit 157 to outside of the communication apparatus 151.

The short-range communication unit 157 of the communication apparatus 151 performs initialization processes when the power supply is switched on and it enters an advertising state. The short-range communication unit 157 periodically broadcasts the advertisement information when the short-range communication unit 157 enters the advertising state. The period between broadcasts corresponds to the advertisement interval. The advertisement information comprises a signal that includes a header 501 and a payload 502. The header comprises basic information such as identification information for identifying the communication apparatus 151. More generally, the header comprises information that identifies the apparatus which transmits the advertisement information. Thus, it will be appreciated that when the information processing apparatus 101 receives advertisement information, it will receive information for recognizing the presence of the communication apparatus 151. Furthermore, when the information processing apparatus 101 transmits the start request of the GATT communication to the communication apparatus 151, the information processing apparatus 101 can establish the BLE connection with the communication apparatus 151.

The header 501 may also store other information such as the type of the advertisement information and the size of the payload 502. The advertisement information may include six types: ADV_IND; ADV_DIRECT_IND; ADV_NONCONN_IND; ADV_SCAN_IND; SCAN_REQ; and SCAN_RSP.

The advertisement information of the ADV_IND type is advertisement information transmitted to an unspecified number of central apparatuses. In response to receiving ADV_IND advertisement information, a central apparatus (e.g. information processing apparatus 101) may send a "Connect Request" (i.e. connection request). The peripheral apparatus (e.g. communication apparatus 151) may respond to a received Connect Request (connection request) to establish a BLE connection with the central apparatus that sent the Connect Request. It should be noted that the central apparatus may also transmit advertisement information of the SCAN_REQ type to the peripheral apparatus in response to receiving ADV_IND type advertisement information from the peripheral apparatus. When the peripheral apparatus receives SCAN_REQ type advertisement information from the central apparatus, the peripheral apparatus transmits advertisement information of the SCAN_RSP type back to the central apparatus. Advantageously, overflowing information that is not transmitted by the peripheral to the central apparatus in the ADV_IND type advertisement information may be transmitted by the peripheral in the SCAN_RSP type advertisement information.

On the other hand, advertisement information of the ADV_NONCONN_IND type is advertisement information for unilaterally providing information from the peripheral apparatus to the central apparatus. The central apparatus may respond to the ADV_NONCONN_IND type advertisement information by sending a Connect Request and/or SCAN_REQ type advertisement information to the peripheral. However, in this case, the peripheral apparatus may be configured to not respond to the Connect Request. Therefore, in this case, the peripheral apparatus does not newly establish a BLE connection with the central apparatus that sent the Connect Request. In addition, the peripheral apparatus may not transmit advertisement information of the SCAN_RSP type in response to receiving advertisement information of the SCAN_REQ type from the central apparatus.

Similar to the ADV_NONCONN_IND type advertisement information, the advertisement information of the ADV_SCAN_IND type is advertisement information for unilaterally providing information from the peripheral apparatus to the central apparatus. The central apparatus may respond to receiving ADV_SCAN_IND type advertisement information by sending a Connect Request and/or SCAN_REQ type advertisement information to the peripheral. However, in this case, the peripheral apparatus does not respond to the Connect Request from the central apparatus and therefore does not newly establish a BLE connection with the central apparatus. However, the central apparatus can respond to receiving SCAN_REQ type advertisement information, by transmitting advertisement information of the SCAN_RSP type to the central apparatus. Therefore, it will be appreciated that the response to SCAN_REQ type advertisement information in this case, is different to the case when the peripheral transmits ADV_NONCONN_IND type advertisement information.

Descriptions of the advertisement information of the ADV_DIRECT_IND type will be omitted.

It should be noted that the advertisement information of the ADV_NONCONN_IND type and the ADV_SCAN_IND type may be transmitted from the peripheral apparatus in a state in which it has established a BLE connection with any one of the central apparatuses. However, as mentioned above, it will be appreciated that in this connected state the peripheral apparatus may not transmit the advertisement information of the ADV_IND type. Conversely, when the peripheral apparatus has not established a BLE connection with any one of the central apparatuses, it will be appreciated that the peripheral can transmit advertisement information of the ADV_IND type, the ADV_NONCONN_IND type, and the ADV_SCAN_IND type.

The payload 502 stores information such as a device name 503 as identification information, mounting profile information, connection information 504 for establishing the BLE connection with the communication apparatus 151, and transmission power 505 of the advertisement information (Tx Power). It should be noted that identification information 506 of the communication apparatus may be included in the advertisement information. The identification information 506 of the communication apparatus includes a MAC address of the communication apparatus, service information of the communication apparatus, an SSID of the access point in the communication apparatus, a password, and the like. It should be noted that the advertisement information may include various information other than the above-described information. According to the present exemplary embodiment, the payload 502 includes specific information for specifying the communication apparatus corresponding to the transmission source of the advertisement information. The specific information is used in unicast search processing as described below. The specific information is, specifically, an IP address of the communication apparatus corresponding to the transmission source of the advertisement information, but the configuration is not limited to this. Any information can be adopted provided the information can be used in the unicast search processing which will be described below. Thus, it will be understood that the specific information is identification information which may be used to discover the communication apparatus during a unicast search process.

Figure 13:
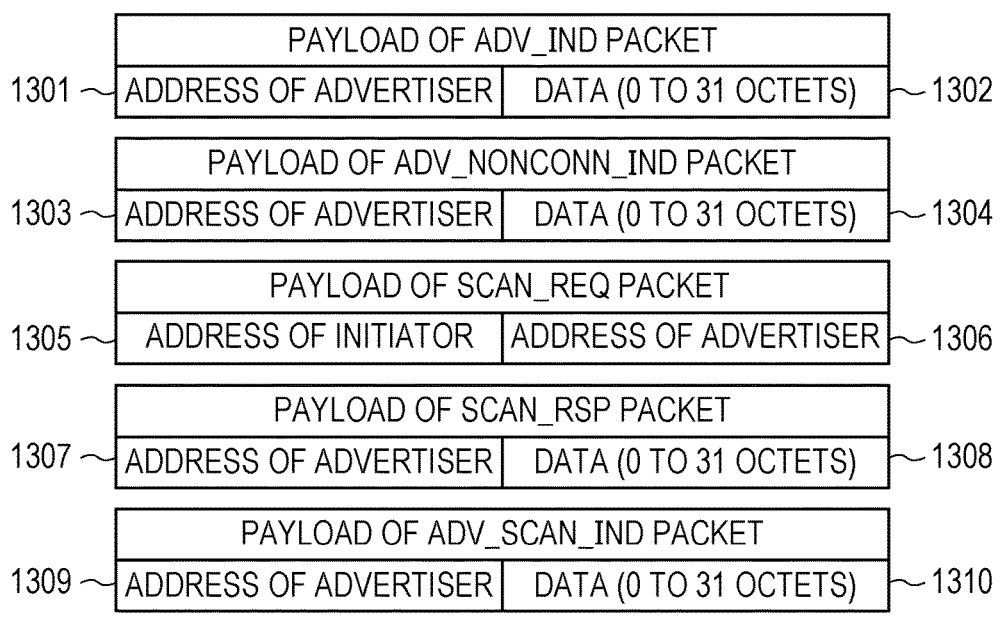
FIG. 13 illustrates the payload content in each type of the advertisement information.

FIG. 13 illustrates the contents of the payload 502 with regard to the advertisement information of each of the types. The advertisement information of the ADV_IND type includes an address 1301 that specifies the address of the peripheral apparatus (advertiser) that transmits the advertisement information. The ADV_IND type advertisement information also includes data 1302 in the payload 502. The advertisement information of the ADV_NONCONN_IND type includes an address 1303 that specifies the address of the peripheral apparatus (advertiser) which transmits the advertisement information. It also includes data 1304 in the payload 502. The advertisement information of the SCAN_REQ type includes an address 1305 that specifies the address of the central apparatus (initiator) that transmits the SCAN_REQ type advertisement information. The SCAN_REQ type advertisement information also includes the address 1306 of the destination peripheral apparatus (advertiser) to which the SCAN_REQ type advertisement information is sent. The advertisement information of the SCAN_RSP type includes the address 1307 of the peripheral apparatus (advertiser) which transmits the SCAN_RSP type advertisement information. The SCAN_RSP type advertisement information also includes data 1308 in the payload 502. The advertisement information of the ADV_S-CAN_IND type includes the address 1309 of the peripheral apparatus (advertiser) which transmits the ADV_S-CAN_IND type advertisement information. The ADV_S-CAN_IND type advertisement information also includes data 1310 in the payload 502.

An apparatus (e.g. a central apparatus) may refer to the address details specified in received advertisement information for identifying the transmission source (e.g. peripheral apparatus) and for setting the transmission destination of any advertisement information that it sends. It should be noted that, according to the present exemplary embodiment, the communication apparatus 151 functioning as the peripheral apparatus broadcasts advertisement information of the ADV_IND type, the ADV_NONCONN_IND type, or the ADV_SCAN_IND type when a BLE function is validated. The data 1302, the data 1304, and the data 1310 included in those pieces of advertisement information include the specific information. However, the configuration is not limited to this mode, and a mode may be adopted in which the advertisement information of the ADV_IND type does not include the specific information, and the advertisement information of the SCAN_RSP type transmitted after this advertisement information includes the specific information. A mode may also be adopted in which the advertisement information of the ADV_SCAN_IND type does not include the specific information, and the advertisement information of the SCAN_RSP type transmitted after this advertisement information includes the specific information.

Figure 3:
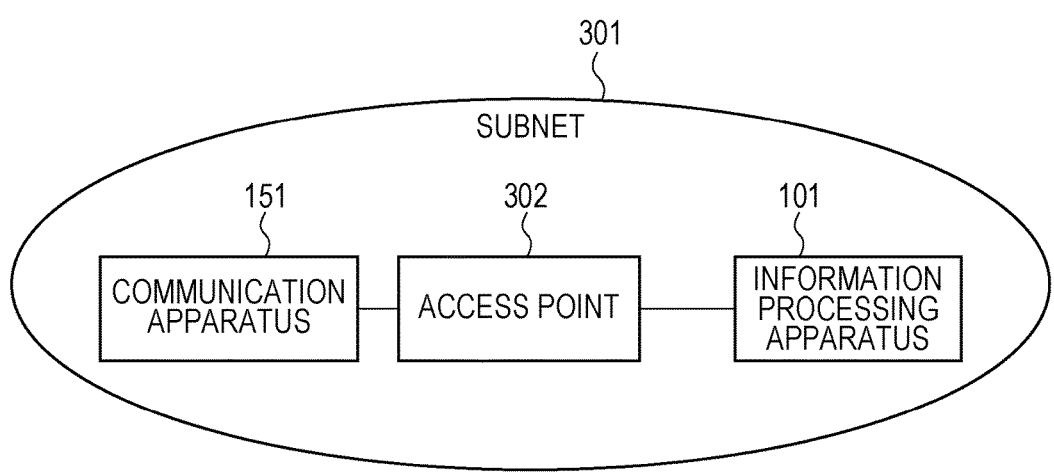
FIG. 3 illustrates a communication system belonging to a network having a single subnet.

Here, an issue of the present exemplary embodiment will be described. First, a mode will be described in which the information processing apparatus 101 searches for the communication apparatus 151 in a communication system belonging to the network constituted by a single subnet, as illustrated in FIG. 3. Both the communication apparatus 151 and the information processing apparatus 101 are directly connected to an access point 302 to form a subnet 301 in the communication system, as illustrated in FIG. 3. It should be noted that the subnet is a unit of the network. According to the present exemplary embodiment, a single subnet is formed by a single access point operating as a master station, and apparatuses that are connected to the access point and which function as remote stations. A method of connecting the communication apparatus 151 and the information processing apparatus 101 to the access point 302 is not limited, but herein, the apparatuses are wirelessly connected to the access point via the communication unit 109 or the communication unit 156 on the basis of Wi-Fi standards. The access point 302 is an external access point similar to access point 131 in FIG. 1.

The information processing apparatus 101 generally executes multicast search processing when searching for a communication apparatus that it can communicate with. Specifically, the multicast search processing is processing for querying a plurality of apparatuses in the subnet to which the apparatus that executes the search processing belongs. The querying occurs via the access point, and the searching searches for a communication apparatus which can communicate with the information processing apparatus. In other words, the multicast search processing is processing for transmitting search information to the plurality of apparatuses at once. The information processing apparatus 101 can search for the apparatus belonging to the subnet to which the information processing apparatus 101 belongs (apparatus inside the subnet to which the information processing apparatus 101 belongs) by the multicast search processing. The multicast search processing is performed based on a protocol such as Bonjour or LLMNR, for example.

The information processing apparatus 101 can identify a communication apparatus 151 belonging to the same subnet by multicast search processing in the communication system of FIG. 3. Thereafter, the information processing apparatus 101 can communicate with the communication apparatus 151 via the access point 302. Specifically, for example, the information processing apparatus 101 can transmit a print job or the like for causing the communication apparatus 151 to execute printing.

Next, a mode will be described in which the information processing apparatus 101 searches for the communication apparatus 151 in the communication system of FIG. 4. The communication system of FIG. 4 belongs to a network comprising a plurality of subnets. The communication apparatus 151 is directly connected to an access point 402 to form a subnet 401 of the communication system. In addition, the information processing apparatus 101 is directly connected to an access point 412 to form a subnet 411. Connections and communications to access point 402 and access point 412 may be, for example, via an internet line. It should be noted that access point 402 may be directly connected to access point 412 by a LAN or the like, for example. However, even when access point 402 is directly connected to access point 412, a state is not established in which one of the access points functions as a master station, and the other access point functions as a remote station. Similarly, as in FIG. 3, the communication apparatus 151 and the information processing apparatus 101 may be wirelessly connected to their respective access points via their respective communication units 109, 156. The wireless connection may be based on Wi-Fi standards. The access point 402 and the access point 412 are external access points similar to access point 131 in FIG. 1.

Figure 4:
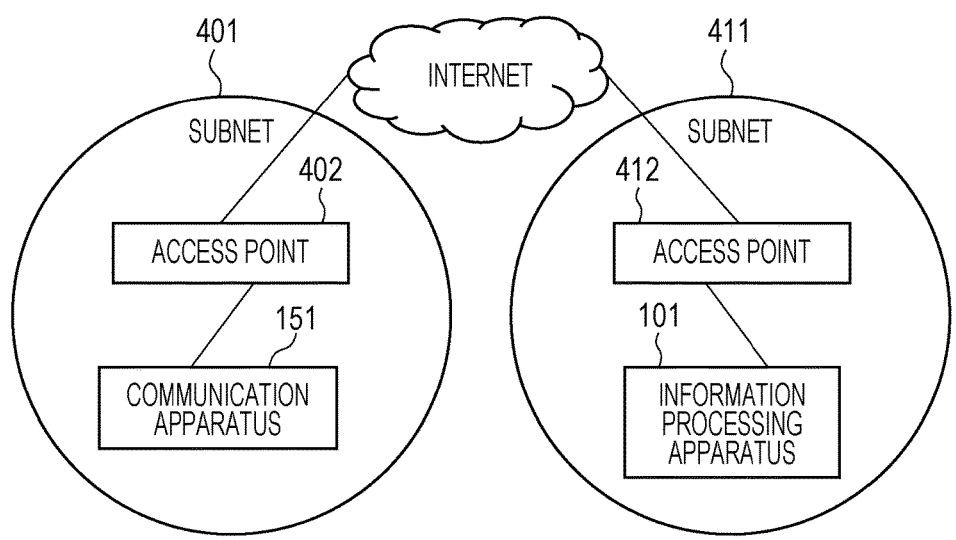
FIG. 4 illustrates a communication system belonging to a network having a plurality of subnets.

When the configuration is adopted in which the mutual subnets can also communicate with each other in the communication system belonging to the network constituted by the plurality of subnets as illustrated in FIG. 4, the mutual apparatuses included in the plurality of respective subnets can communicate with each other. Specifically, for example, after the information processing apparatus 101 discovers the communication apparatus 151 by the search processing, the information processing apparatus 101 can transmit information to the communication apparatus 151 via access point 402 and access point 412.

Herein, and as described above, the information processing apparatus 101 may execute multicast search processing for searching for a communication apparatus 151 which it can communicate with. However, it will be appreciated that in some cases the information processing apparatus 101 may not discover the communication apparatus 151 via the multicast search processing in a communication system constituted by the plurality of subnets as illustrated in FIG. 4. In general, this is because the apparatus belonging to the subnet other than the subnet to which the apparatus that executes the search processing belongs is not searched for by the multicast search processing.

Therefore, it will be understood that the information processing apparatus 101 in a communication system constituted by a plurality of subnets may only communicate with a communication apparatus 151 located in a different subnet if the information processing apparatus 101 can discover the communication apparatus 151 in the different subnet. However, as mentioned previously, in traditional systems it may not be possible for the information processing apparatus 101 to discover a communication apparatus 151 belonging to a different subnet to that of the information processing apparatus 101.

In view of the above issue, and according to the present exemplary embodiment, a mode will be described in which the information processing apparatus 101 is controlled to discover a communication apparatus 151 belonging to a different subnet to that of the information processing apparatus 101. Specifically, the information processing apparatus 101 performs unicast search processing to discover a communication apparatus 151. The unicast search process uses specific information (e.g. identification information) that is transmitted by the short-range communication unit 157 of the communication apparatus 151. The unicast search processing comprises the information processing apparatus 101 querying one or more particular apparatuses that are in the same network as the information processing apparatus 101 so as to search for a particular apparatus (i.e. target apparatus). The querying occurs via the access point. In other words, the unicast search processing is processing for transmitting search information to a previously specified single apparatus. Information such as an IP address (specific information) of the search target apparatus is used in the unicast search processing to specify the search target apparatus. It should be noted that the information processing apparatus 101 can also search for an apparatus belonging to a subnet that is different from the subnet to which the information processing apparatus 101 belongs (apparatus outside the subnet to which the information processing apparatus 101 belongs) by the unicast search processing.

As a result, the information processing apparatus 101 can discover the communication apparatus 151 belonging to the subnet that is different from the subnet to which the information processing apparatus 101 belongs. Furthermore, the information processing apparatus 101 scans for specific information to use in the unicast search. This scanning occurs before a user initiates the search processing for a particular target apparatus. A benefit of this approach is that the information processing apparatus 101 can discover the communication apparatus 151 via the unicast search, even when the communication apparatus 151 stops transmitting the specific information after the search instruction from the user is accepted/initiated. The information processing apparatus 101 can also discover the communication apparatus 151 by the unicast search even in a case where the information processing apparatus 101 is located outside the transmission range of the communication apparatus 151 at timing time after the search instruction is accepted (i.e. after the user initiates the search processing).

According to the present exemplary embodiment, the specific information used for the unicast search is obtained by the short-range wireless communication (herein, BLE). As a result, the information processing apparatus 101 can easily obtain the specific information of the communication apparatus 151 belonging to the subnet that is different from the subnet to which the information processing apparatus 101 belongs (for example, without accepting the input from the user).

Figure 8:
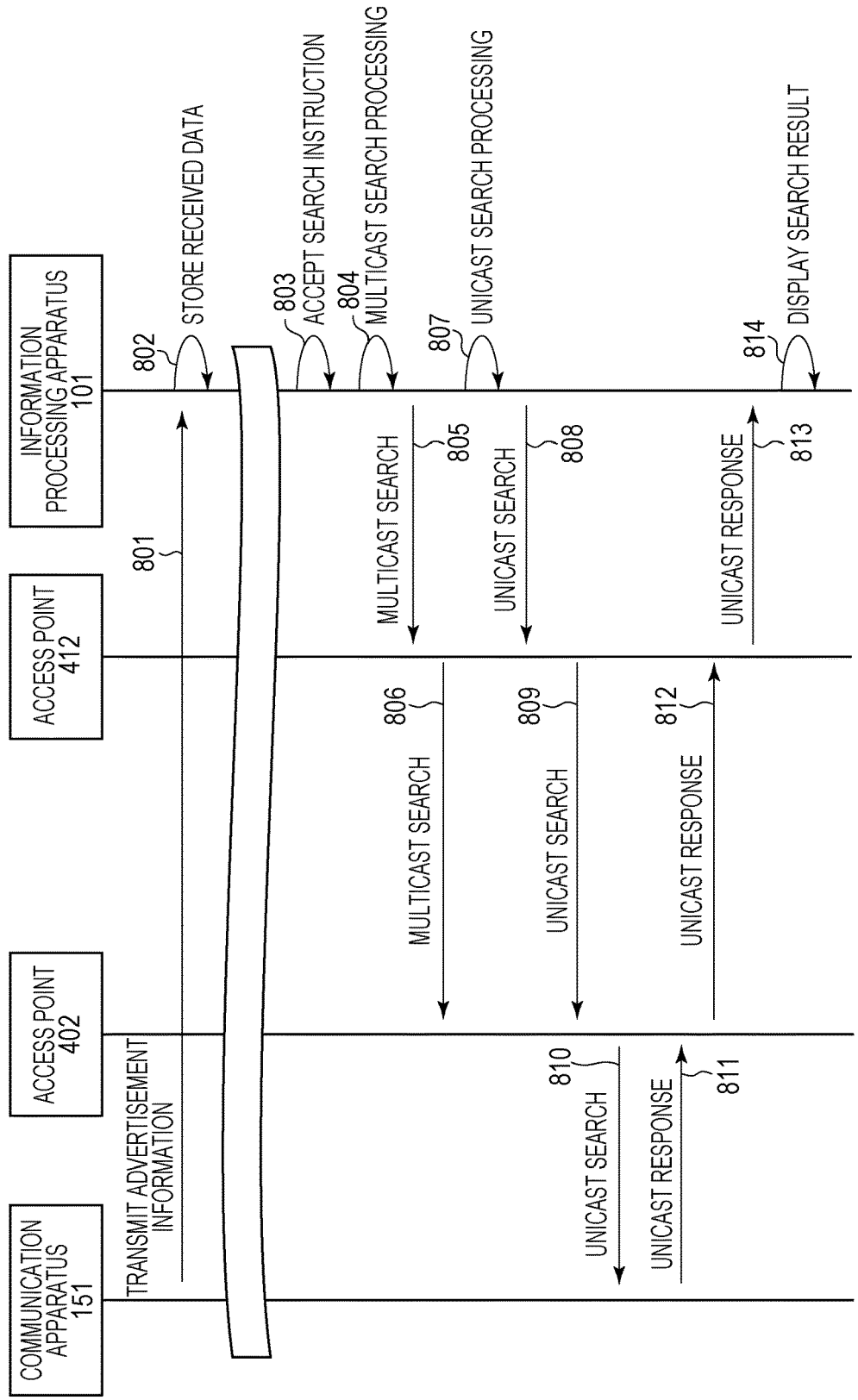
FIG. 8 is a sequence diagram illustrating processes executed by various apparatuses when a search is performed for a communication apparatus that belongs to a subnet which is different from the subnet to which the information processing apparatus belongs.

FIG. 8 is a sequence diagram illustrating processes executed by the respective apparatuses when the information processing apparatus 101 searches for the communication apparatus 151 belonging to the subnet that is different from the subnet to which the information processing apparatus 101 belongs according to the present exemplary embodiment. It should be noted that the processes may be executed by the respective apparatuses, while the CPUs of the respective apparatuses develop the various programs stored in the storage areas such as the ROMs and the RAMs of the respective apparatuses into the RAMs of the respective apparatuses and execute the developed programs.

First, the communication apparatus 151 executes the transmission of the advertisement information (S801) by the short-range communication unit 157. The type of the advertisement information transmitted by the communication apparatus 151 at this time is ADV_IND, ADV_NONCON-N_IND, or ADV_SCAN_IND. The advertisement information transmitted at this time includes the specific information (i.e. identification information of the communication apparatus 151 such as the IP address of the communication apparatus 151). Alternatively, for example, in a case where the type of the advertisement information transmitted at this time is ADV_IND or ADV_SCAN_IND, the advertisement information does not necessarily need to include the specific information. In this case, the information processing apparatus 101 that has received this advertisement information transmits advertisement information of the SCAN_REQ type to the communication apparatus 151. Thereafter, the communication apparatus 151 transmits advertisement information of the SCAN_RSP type, wherein the SCAN_RSP type advertisement information includes the specific information. As a result, in this latter case, it will be appreciated that the information processing apparatus 101 obtains the specific information from the communication apparatus 151 after the communication apparatus 151 transmits the ADV_IND, ADV_NONCONN_IND, or ADV_S-CAN_IND advertisement information.

Subsequently, the information processing apparatus 101 analyzes the advertisement information received from the communication apparatus 151 and saves the specific information included in the advertisement information in memory such as in RAM 105 (S802).

It should be noted that, in a case where an apparatus outside the information processing apparatus 101 other than the communication apparatus 151 also transmits the advertisement information at this time, the information processing apparatus 101 obtains this advertisement information and saves the specific information included in this advertisement information in the memory.

Figure 14:
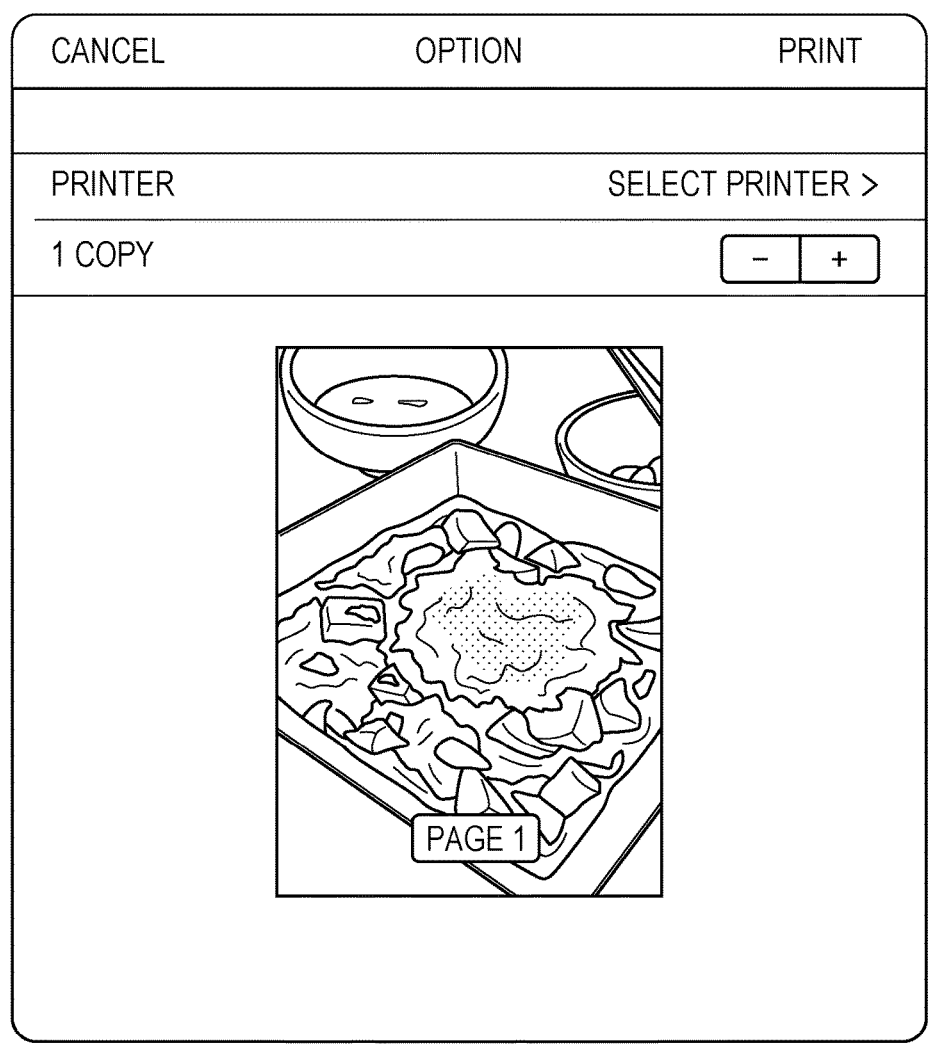
FIG. 14 illustrates an example of a screen for accepting a search instruction.

Thereafter, the information processing apparatus 101 accepts a user initiated search instruction to search for a target apparatus (S803). In response to accepting this instruction, the information processing apparatus 101 starts searching for the target apparatus. The communication destination of the information processing apparatus 101 may be set to correspond to the target apparatus. Specifically, for example, first, the information processing apparatus 101 accepts pressing of icons for selecting printing target image data and printing the selected image data from the user. Thereafter, the information processing apparatus 101 displays a screen for accepting an input of the printing setting and accepting a setting of the communication apparatus corresponding to the transmission destination of the print job on the display unit 108 as illustrated in FIG. 14. The information processing apparatus 101 then accepts pressing of a "select printer" button on this screen by the user and accepts the search instruction. It should be noted that the information processing apparatus 101 accepts pressing of a "print" button on the screen illustrated in FIG. 14 and transmits the print job based on the image data of the printing target to the communication apparatus selected through the pressing of the "select printer" button.

Subsequently, the information processing apparatus 101 executes the multicast search processing (S804). Specifically, the information processing apparatus 101 transmits a multicast search request to the access point 412 to which the information processing apparatus 101 is directly connected (S805). The multicast search request includes, for example, a condition (service information or the like) of the apparatus that the information processing apparatus 101 searches for. Herein, the information processing apparatus 101 sets an apparatus (apparatus that can execute printing) having an image forming function (printer function) as the search condition.

Subsequently, in a case where the multicast search request is received, the access point 412 transfers the multicast search request to the apparatus that is connected to the access point 412 and performs a query on whether or not it is matched with this search request (S806). Since the only apparatus (other than the information processing apparatus 101) connected to the access point 412 is access point 402 in the communication system of FIG. 4, the query is made to the access point 402. However, the access point 402 does not accept the multicast search request by the apparatus belonging to the subnet that is different from the subnet to which the access point 402 belongs and therefore does not return a response.

Subsequently, the information processing apparatus 101 executes the unicast search processing (S807). Specifically, the information processing apparatus 101 transmits a unicast search request to the access point 412 to which the information processing apparatus 101 is directly connected (S808). The unicast search request includes, for example, a condition (service information or the like) of the apparatus searched for by the information processing apparatus 101. Herein, similarly as in the multicast search request, the information processing apparatus 101 sets the apparatus including the image forming function (printer function) as the search condition. The unicast search request includes information for specifying the search target apparatus. The specific information saved in the memory in S802 is used as this information. As a result, the information processing apparatus 101 can specify the communication apparatus 151 as the search target apparatus and execute the unicast search processing.

Subsequently, in a case where the unicast search request is received, the access point 412 confirms a destination of the unicast search request (search target apparatus) and performs a route selection (routing) of the unicast search request. Herein, since the communication apparatus 151 as the search target apparatus is connected to the access point 402, the unicast search request is transferred to the access point 402 (S809).

Subsequently, the access point 402 transfers the unicast search request to the communication apparatus 151 and performs a query on whether or not it is matched with this search request (S810). In a case where the unicast search request is received, the communication apparatus 151 determines whether or not it is matched with this unicast search request (matched with the condition of the apparatus searched for by the information processing apparatus 101) (S811). Herein, since the communication apparatus 151 can provide the service of the image forming function, and since the IP address included in the specific information matches the IP address of the communication apparatus 151, the communication apparatus 151 returns a response to the query (S812). This response is transferred to the information processing apparatus 101 via the access points 402 and 412 (S813, S814). It should be noted that the response includes, for example, identification information (name, device name, IP address, MAC address, or the like) of the apparatus corresponding to the transmission source of the response, information of the service that can be provided by this apparatus, a port number used by this apparatus, and the like.

When the response is received, the information processing apparatus 101 discovers the communication apparatus 151 on the network to which the information processing apparatus 101 belongs. Subsequently, the information processing apparatus 101 executes a display control step of displaying a list of apparatuses discovered by the multicast search processing and the unicast search processing as the response to the search instruction accepted from the user (S815). At this time, since only the communication apparatus 151 is discovered, the identification information (name, device name, IP address, MAC address, or the like) of the communication apparatus 151 is displayed on the list. It should be noted that, in a case where a plurality of apparatuses are discovered by the multicast search processing and the unicast search processing, the plurality of apparatuses are displayed on the list.

It should be noted that, in a case where pieces of advertisement information having respective specific information are received from the plurality of communication apparatuses, the information processing apparatus 101 saves the respective specific information in its memory. Subsequently, the information processing apparatus 101 performs a separate unicast search process for each saved specific information.

Figure 9:
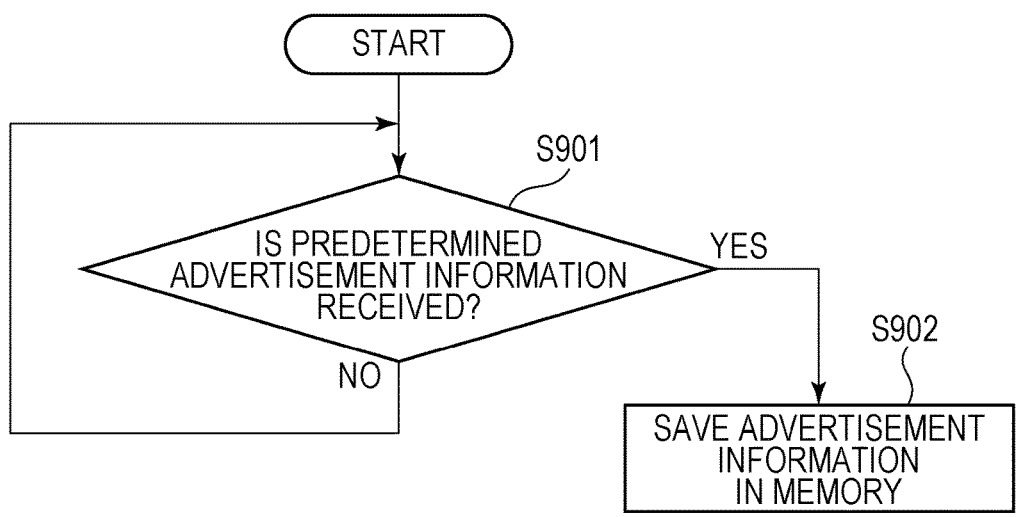
FIG. 9 is a flow chart illustrating processes that may be executed when the information processing apparatus obtains the advertisement information.

FIG. 9 is a flow chart illustrating processes executed when the information processing apparatus 101 obtains the advertisement information according to the present exemplary embodiment. It should be noted that the processes illustrated in the flow chart of FIG. 9 may be performed, for example, while the CPU 103 reads out the programs stored in the ROM 104, the external storage device 106, and the like onto the RAM 105 for execution. The flow chart illustrated in FIG. 9 is started, for example, in a case where the BLE function of the information processing apparatus 101 is validated.

First, in S901, the CPU 103 determines whether or not predetermined advertisement information is received. It should be noted that the predetermined advertisement information is advertisement information having specific information. The CPU 103 may perform the determination on whether or not the received advertisement information is the predetermined advertisement information, for example, by analyzing the received advertisement information and determining whether or not it comprises specific information. The CPU 103 may also perform the determination, for example, by determining whether or not the payload of the received advertisement information includes the predetermined specific information.

In a case where it is determined that the predetermined advertisement information is received, in S902, the CPU 103 saves the predetermined advertisement information in the memory such as the RAM 105. It should be noted that in some cases the CPU 103 may only save the specific information, rather than all of the advertisement information. On the other hand, in a case where it is determined that the predetermined advertisement information is not received, the CPU 103 performs the processing in S901 again and waits for the reception of the predetermined advertisement information.

Figure 10:
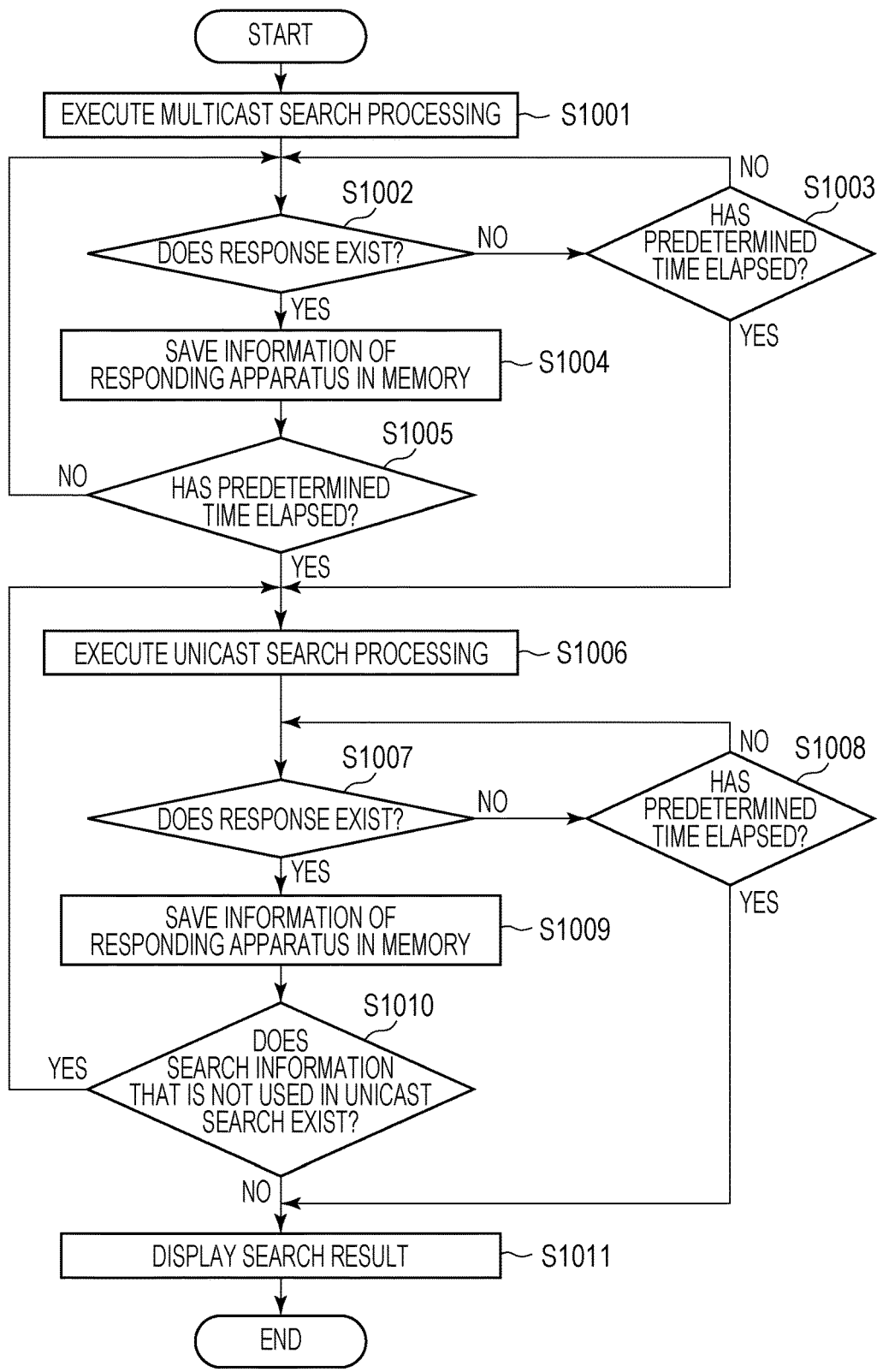
FIG. 10 is a flow chart illustrating processes that may be executed when the information processing apparatus searches for an apparatus corresponding to a communication destination of the information processing apparatus.

FIG. 10 is a flow chart illustrating processing executed when the information processing apparatus 101 searches for the apparatus corresponding to the communication destination of the information processing apparatus 101 (i.e. target apparatus) according to the present exemplary embodiment. It should be noted that processes illustrated in the flow chart of FIG. 10 may be performed, for example, while the CPU 103 reads out the programs stored in the ROM 104, the external storage device 106, and the like onto the RAM 105 for execution. The flow chart illustrated in FIG. 10 is started, for example, in a case where the information processing apparatus 101 accepts the search instruction for the apparatus corresponding to the communication destination of the information processing apparatus 101 (i.e. target apparatus) from the user.

First, in S1001, the CPU 103 executes the multicast search processing. Specifically, the CPU 103 transmits the multicast search request to the access point 412 to which the information processing apparatus 101 is directly connected.

Subsequently, in S1002, the CPU 103 determines whether or not a response is made to the multicast search request executed in S1001. In a case where it is determined that the response is not made to the multicast search request executed in S1001, the CPU 103 determines in S1003 whether or not a predetermined time t1 has elapsed since the multicast search is executed. In a case where it is determined that the predetermined time t1 has elapsed, the CPU 103 proceeds to S1006, and in a case where it is determined that the predetermined time t1 has not elapsed, the CPU 103 executes the processing in S1002 again and waits for the response.

On the other hand, in a case where it is determined that the response is made to the multicast search request executed in S1001, the CPU 103 saves the information of the apparatus corresponding to the transmission source of the received response in the memory such as the RAM 105 in S1004. It should be noted that the response includes, for example, the identification information of the apparatus corresponding to the transmission source of the response (name, device name, IP address, MAC address, or the like) of the apparatus corresponding to the transmission source of the response, the information of the service that can be provided by this apparatus, the port number used by this apparatus, and the like. For this reason, the CPU 103 saves those pieces of information in the memory such as the RAM 105.

Next, in S1004, the CPU 103 determines whether or not a predetermined time t2 has elapsed since the multicast search is executed. It should be noted that t1 and t2 may be the same time or may be different from each other. In a case where it is determined that the predetermined time t2 has elapsed, the CPU 103 proceeds to S1006, and in a case where it is determined that the predetermined time t2 has not elapsed, the CPU 103 executes the processing in S1002 again and waits for the response.

In S1006, the CPU 103 executes the unicast search processing. Specifically, the CPU 103 transmits the unicast search request to the access point 412 to which the information processing apparatus 101 is directly connected. At this time, the CPU 103 executes the unicast search processing by using the specific information obtained by the processing described with reference to the flow chart of FIG. 9. In a case where multiple pieces of specific information are obtained, the CPU 103 executes the unicast search processing by using any one of the multiple pieces of specific information. It should be noted that, in a case where any of the specific information is not obtained by the processing described with reference to the flow chart illustrated in FIG. 9, a configuration may be adopted in which the processes in S1006 to S1010 are omitted, and the unicast search processing is not executed.

Subsequently, in S1007, the CPU 103 determines whether or not a response to the unicast search request executed in S1006 exists. In a case where it is determined that the response to the unicast search request executed in S1006 does not exist, the CPU 103 determines in S1008 whether or not a predetermined time t3 has elapsed since the unicast search is executed. In a case where it is determined that the predetermined time t3 has elapsed, the CPU 103 proceeds to S1011, and in a case where it is determined that the predetermined time t3 has not elapsed, the CPU 103 executes the processing in S1007 again and waits for the response.

On the other hand, in a case where it is determined that the response to the unicast search request executed in S1006 exists, in S1009, the CPU 103 saves the information of the apparatus corresponding to the transmission source of the received response in the memory such as the RAM 105. As described above, the response includes, for example, the identification information (name, device name, IP address, MAC address, or the like) of the apparatus corresponding to the transmission source of the response, the information of the service that can be provided by this apparatus, the port number used by this apparatus, and the like. For this reason, the CPU 103 saves those pieces of information in the memory such as the RAM 105.

Next, in S1010, the CPU 103 determines whether or not there are any specific information that have not yet been used for the unicast search among the already obtained specific information. In a case where it is determined that there is specific information that has not yet been used in the unicast search, the CPU 103 proceeds to S1006 and executes the unicast search by using any one of the unused specific information. On the other hand, in a case where it is determined that all of the specific information have been used for the unicast search, the CPU 103 proceeds to S1011.

In S1011, the CPU 103 displays the search result of the multicast search processing and the unicast search processing on the display unit 108. Specifically, the CPU 103 refers to the information saved in S1004 and S1009 and displays the list of the information related to the apparatuses discovered by the multicast search processing and the unicast search processing on the display unit 108. The CPU 103 specifically displays the identification information (name, device name, IP address, MAC address, or the like) of the apparatuses discovered by the multicast search processing and the unicast search processing on a list. It should be noted that, in a case where the apparatuses discovered by the multicast search processing and the unicast search processing do not exist, a screen for notifying the user that the apparatuses are not discovered is displayed on the display unit 108.

It should be noted that the information processing apparatus 101 accepts an input from the user after the search result is displayed on the display unit 108 and asks the user to select one of the identification information included in the search result (selection accepting step). Subsequently, the apparatus corresponding to the selected identification information is specified as the communication apparatus corresponding to the transmission destination of the print job. Subsequently, in a case where a print job transmission instruction is accepted from the user, the information processing apparatus 101 transmits a print job created on the basis of the image data previously selected by the user to the communication apparatus corresponding to the transmission destination of the print job. As a result, the user can cause the desired communication apparatus to execute the printing.

When the above-described mode is adopted, the information processing apparatus 101 can discover the apparatus belonging to the subnet that is different from the subnet to which the information processing apparatus 101 belongs and communicate with the discovered apparatus.

It should be noted that, in the above-described configuration, the search result is displayed on the display unit 108 after the execution of the multicast search processing and the unicast search processing is ended, but the configuration is not limited to this mode. For example, the search result including the discovered communication apparatus may be displayed on the display unit 108 in a state where the first communication apparatus is discovered. Thereafter, the information processing apparatus 101 may add the discovered communication apparatus to the list of the search result each time the communication apparatus is newly discovered and display the list.

Processing in a case where the information processing apparatus 101 receives the advertisement information after the acceptance of the search instruction (S803) has not been described above, but the information processing apparatus 101 also executes the scanning of the advertisement information after the acceptance of the search instruction. That is, in a case where the information processing apparatus 101 also receives the advertisement information after the acceptance of the search instruction, the specific information included in the advertisement information is appropriately saved in the memory such as the RAM 105 and is appropriately used at a timing when the unicast search is executed.

The information processing apparatus 101 may also execute the scanning of the advertisement information after the search result is displayed on the display unit 108 (S814). In this case, each time the information processing apparatus 101 receives the advertisement information and saves the specific information included in the advertisement information in the memory such as the RAM 105, the unicast search using the specific information is executed. Subsequently, each time the communication apparatus is newly discovered, the information processing apparatus 101 adds the discovered communication apparatus to the list of the search result and displays the list.

The mode has been adopted in the above-described configuration in which the information processing apparatus 101 executes the scanning of the advertisement information before the acceptance of the search instruction from the user, but the configuration is not limited to this mode. For example, a mode may be adopted in which the scanning of the advertisement information is executed in a case where the search instruction is accepted from the user. In this case, the flow chart of FIG. 9 is started in a case where the search instruction is accepted from the user.

In addition, the information processing apparatus 101 executes the multicast search processing in the above-described configuration, but broadcast search processing may be executed instead of the multicast search processing.

Moreover, according to the present exemplary embodiment, the information processing apparatus 101 executes both the multicast search processing and the unicast search processing in a case where the search instruction is accepted from the user. As a result, the information processing apparatus 101 can discover both the communication apparatus belonging to the subnet to which the information processing apparatus 101 belongs and the communication apparatus belonging to the subnet to which the information processing apparatus 101 does not belong. It should be noted that the information processing apparatus 101 generally communicates with the communication apparatus belonging to the subnet to which the information processing apparatus 101 belongs in many cases. For example, the execution of the unicast search processing may be avoided in a case where the communication apparatus can be discovered by the multicast search processing. The order of the multicast search processing and the unicast search processing is not restricted in a mode in which both the multicast search processing and the unicast search processing are executed.

Furthermore, the mode has been adopted in the above-described configuration in which the information processing apparatus 101 executes the unicast search in a case where the specific information already saved in the memory exists, but the configuration is not limited to this mode. For example, in a case where the transmission source of the advertisement information including the specific information already saved in the memory is discovered by the multicast search, the execution of the unicast search for searching for this transmission source may be avoided. It should be noted that the determination on whether or not the transmission source of this advertisement information is discovered by the multicast search can be executed by referring to the information of the address included in the advertisement information and the identification information included in the response to the multicast search.

For example, in a case where the advertisement information is received, the information processing apparatus 101 may compare the subnet to which the transmission source of this advertisement information belongs with the subnet to which the information processing apparatus 101 belongs. Subsequently, in a case where those subnets are the same, the information processing apparatus 101 may avoid the saving of the information related to this advertisement information. That is, in a case where the subnet to which the transmission source of the advertisement information belongs is the same as the subnet to which the information processing apparatus 101 belongs, the information processing apparatus 101 may avoid the execution of the unicast search processing using the specific information included in this advertisement information. It should be noted that the advertisement information includes information for specifying the subnet to which the transmission source of this advertisement information belongs in this mode.

The information processing apparatus 101 is configured to delete the specific information at a timing when the power source of the information processing apparatus 101 is turned off. However, the timing for deleting the specific information is not limited to this. For example, a mode may be adopted in which the search information used for the unicast search processing is deleted each time the unicast search processing is performed. In addition, for example, the specific information may be deleted in a case where a screen for executing the printing is not displayed, a case where an operation of application for executing the printing is stopped, or the like.

Second Exemplary Embodiment

As described above, the communication apparatus 151 needs to transmit the advertisement information of the ADV_IND type to establish the BLE connection with the information processing apparatus 101. For this reason, for example, in a case where the communication apparatus 151 has a function of establishing the BLE connection and processing the GATT communication with the information processing apparatus 101, the communication apparatus 151 preferably transmits the advertisement information of the ADV_IND type during an advertising mode/state. However, when the BLE connection is established, it will be understood that the communication apparatus 151 does not transmit the advertisement information of the ADV_IND type. In view of the above, and according to the present exemplary embodiment, descriptions will be given of a mode for changing the type of the transmitted advertisement information in a case where the BLE connection is established and a case where the BLE connection is not established.

It should be noted that a communication system similar to that of the first exemplary embodiment is used according to the present exemplary embodiment, and descriptions of a configuration similar to that of the first exemplary embodiment will be omitted.

Figure 11:
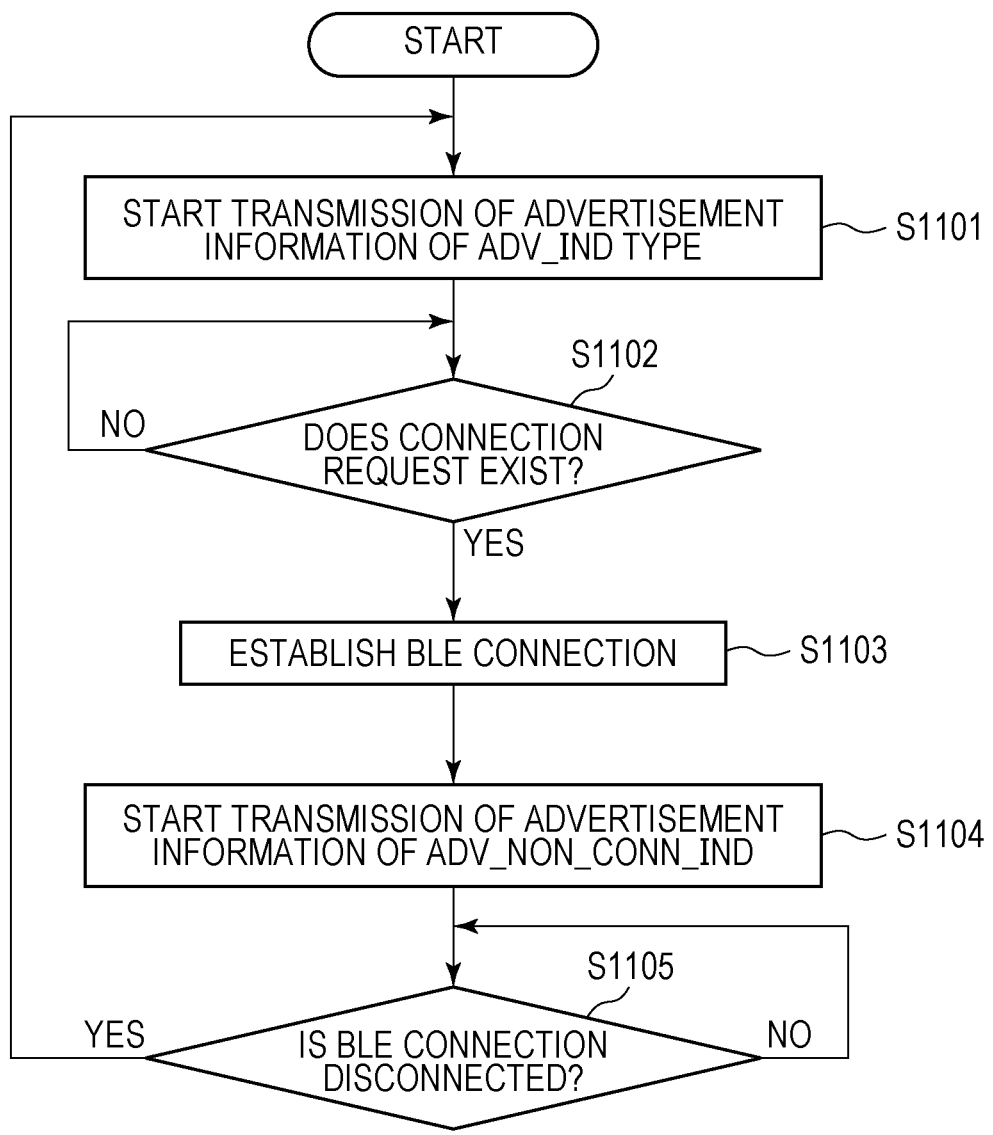
FIG. 11 is a flow chart illustrating processes that may be executed when the communication apparatus transmits the advertisement information.

FIG. 11 is a flow chart illustrating processing executed when the communication apparatus 151 transmits the advertisement information according to the present exemplary embodiment. It should be noted that processes illustrated in the flow chart of FIG. 10 may be performed, for example, while the CPU 154 reads out the program stored in the ROM 152 or the like onto the RAM 153 for execution. The flow chart illustrated in FIG. 10 is started, for example, in a case where the BLE function of the communication apparatus 151 is validated.

First, in S1101, the CPU 154 starts the transmission of the advertisement information. According to the present exemplary embodiment, the communication apparatus 151 can transmit the advertisement information of the ADV_IND type. The communication apparatus 151 can also transmit the advertisement information of one or both of the ADV_NONCONN_IND type and the ADV_SCAN_IND type. At this time, since the communication apparatus 151 does not yet establish the BLE connection with the other apparatus, the CPU 154 starts the transmission of the advertisement information of the ADV_IND type. It should be noted that the advertisement information of the ADV_IND type started to be transmitted at this time includes the specific information according to the present exemplary embodiment.

Next, in S1102, the CPU 154 determines whether or not the Connect Request (connection request) is received. In a case where it is determined that the Connect Request is not received, the CPU 154 performs the processing in S1102 again and continues the transmission of the advertisement information of the ADV_IND type until the Connect Request is received. On the other hand, in a case where it is determined that the Connect Request is received, the CPU 154 proceeds to S1103 and establishes the BLE connection between the apparatus that has transmitted the received Connect Request and the communication apparatus 151. The CPU 154 stops the transmission of the advertisement information of the ADV_IND type since the communication apparatus 151 establishes the BLE connection.

In S1104, the CPU 154 starts the transmission of the advertisement information of the ADV_NONCONN_IND type. In other words, in a case where the communication apparatus 151 establishes the BLE connection, the CPU 154 changes its state from a state in which the advertisement information of the ADV_IND type is transmitted to a state in which the advertisement information of the ADV_NONCONN_IND type is transmitted. It should be noted that the advertisement information of the ADV_NONCONN_IND type being transmitted at this time includes the specific information according to the present exemplary embodiment.

As described above, the CPU 154 can transmit the advertisement information of the ADV_NONCONN_IND type even when the communication apparatus 151 establishes the BLE connection. For this reason, the communication apparatus 151 can transmit the specific information to the apparatus (the information processing apparatus 101 or the like) outside the communication apparatus 151 by the processing in S1104 also in a case where the communication apparatus 151 establishes the BLE connection. Consequently, even in a case where the communication apparatus 151 establishes the BLE connection, the apparatus outside the communication apparatus 151 can discover the communication apparatus 151 by the unicast search.

Thereafter, in S1105, the CPU 154 determines whether or not the BLE connection by the communication apparatus 151 is disconnected. In a case where it is determined that the BLE connection by the communication apparatus 151 is not disconnected, the CPU 154 performs the processing in S1105 again, and until the BLE connection is disconnected, the CPU 154 continues the transmission of the advertisement information of the ADV_NONCONN_IND type. On the other hand, in a case where it is determined that the BLE connection by the communication apparatus 151 is disconnected, the CPU 154 proceeds to S1101 again.

In S1101, the CPU 154 switches its state from a state in which the advertisement information of the ADV_NONCONN_IND type is transmitted to a state in which the advertisement information of the ADV_IND type is transmitted. As a result, the CPU 154 enters a state in which the BLE connection with the other apparatus can be executed again.

As described above, according to the present exemplary embodiment, the communication apparatus 151 transmits the advertisement information of the ADV_IND type in a state in which the BLE connection with the other apparatus is not established. When the above-described mode is adopted, the communication apparatus 151 establishes the BLE connection with the other apparatus and can execute the GATT communication with the other apparatus. On the other hand, the communication apparatus 151 transmits the advertisement information of the ADV_NONCONN_IND type in a state in which the BLE connection with the other apparatus is established. When the above-described mode is adopted, the communication apparatus 151 can also transmit the specific information to the outside after the BLE connection with the other apparatus is established.

It should be noted that the processing of the information processing apparatus 101 is similar to that of the first exemplary embodiment. When the communication apparatus 151 operates as described above, the information processing apparatus 101 can obtain the specific information to be used for the unicast search processing irrespective of whether the received advertisement information is of the ADV_IND type or the ADV_NONCONN_IND type.

The communication apparatus 151 transmits the advertisement information of the ADV_NONCONN_IND type in a state in which the BLE connection with the other apparatus is established in the above-described configuration, but the configuration is not limited to this mode. For example, the communication apparatus 151 may transmit the advertisement information including the specific information of the ADV_SCAN_IND type in a state in which the BLE connection with the other apparatus is established. In addition, the communication apparatus 151 may transmit the advertisement information of the ADV_SCAN_IND type that does not include the specific information in a state in which the BLE connection with the other apparatus is established, for example. The advertisement information including the specific information of the SCAN_RSP type may be transmitted in a case where the advertisement information of the SCAN_REQ type is received from the information processing apparatus 101.

Third Exemplary Embodiment

According to the present exemplary embodiment, descriptions will be given of a mode in which the specific information included in the advertisement information of the same transmission source is sequentially updated and managed, and the amount of saved data can be reduced.

It should be noted that a communication system similar to that of the first and second exemplary embodiments is used according to the present exemplary embodiment, and descriptions of configurations similar to those of the first and second exemplary embodiments will be omitted.

Figure 12:
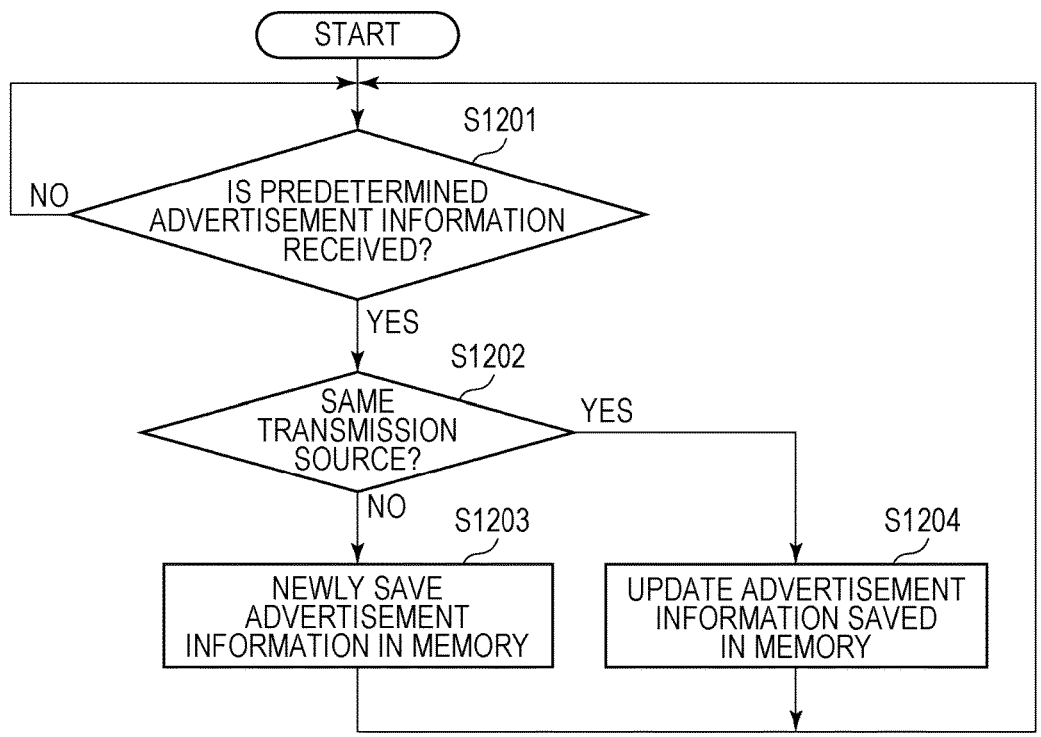
FIG. 12 is a flow chart illustrating processes that may be executed when the information processing apparatus obtains the advertisement information.

FIG. 12 is a flow chart illustrating processing executed when the information processing apparatus 101 obtains the advertisement information according to the present exemplary embodiment. It should be noted that the processes illustrated in the flow chart of FIG. 12 may be processed, for example, while the CPU 103 reads out the programs stored in the ROM 104, the external storage device 106, and the like onto the RAM 105 for execution. The flow chart illustrated in FIG. 12 is started, for example, in a case where the BLE function of the information processing apparatus 101 is validated.

First, in S1201, the CPU 103 determines whether or not the predetermined advertisement information is received. It should be noted that the predetermined advertisement information is advertisement information including the specific information. The CPU 103 may perform the determination on whether or not the received advertisement information is the predetermined advertisement information, for example, by analyzing the received advertisement information and determining whether or not it includes specific information. The CPU 103 may also perform the determination, for example, by determining whether or not the payload of the received advertisement information includes the predetermined identification information.

In a case where it is determined that the predetermined advertisement information is not received, the CPU 103 performs the processing in S1201 again and waits for the reception of the predetermined advertisement information.

On the other hand, in a case where it is determined that the predetermined advertisement information is received, in S1202, the CPU 103 determines whether or not the transmission source of the received advertisement information is the same as the transmission source of the advertisement information including the specific information already saved in the memory. It should be noted that the transmission source of the received advertisement information may be compared with the transmission source of the already saved advertisement information in a case where the CPU 103 saves the advertisement information itself. The CPU 103 can also specify the transmission sources of the respective advertisement information by referring to the information of the addresses of the respective advertisement information (the addresses 1301, 1303, and 1307, and the like). In a case where it is determined that the transmission source of the received advertisement information is not the same as the transmission source of the advertisement information including the specific information already saved in the memory, the CPU 103 proceeds to S1203. In S1203, the CPU 103 newly saves the received advertisement information in the memory such as the RAM 105. It should be noted that the CPU 103 may save at least the specific information and the address information among the advertisement information at this time, rather than all of the advertisement information.

On the other hand, in a case where it is determined that the transmission source of the received advertisement information is the same as the transmission source of the advertisement information including the specific information already saved in the memory, the CPU 103 proceeds to S1204. In S1204, the CPU 103 saves the received advertisement information in the memory such as the RAM 105 and also deletes the advertisement information determined to have the same transmission source as this advertisement information from the memory such as the RAM 105. That is, the CPU 103 updates the advertisement information already saved in the memory into information related to the new advertisement information having the same transmission source. It should be noted that the CPU 103 may save or update at least the specific information and the address information among the advertisement information at this time instead of all of the advertisement information similarly as described above. When the above-described mode is adopted, it is possible to reduce the amount of data saved in the memory. For example, similarly as in the second exemplary embodiment, it is also possible to collectively manage the specific information for each transmission source instead of separately saving the specific information for each type in a case where pieces of the advertisement information having different types are transmitted from the same communication apparatus. In addition, for example, in a case where the specific information transmitted by the communication apparatus is updated because the IP address or the like of the communication apparatus is changed, the specific information managed by the information processing apparatus 101 can also be updated. That is, it is possible to execute the unicast search processing by using the specific information after the update.

It should be noted that, in a case where multiple pieces of specific information are already saved in the memory, the CPU 103 determines whether or not one of the transmission sources of the multiple pieces of specific information is the same as the transmission source of the predetermined advertisement information. Subsequently, the CPU 103 updates the specific information included in the advertisement information determined to have the same transmission source among the multiple pieces of specific information already saved in the memory.

Other Exemplary Embodiments

The mode has been adopted in the above-described configuration in which the information processing apparatus 101 obtains the specific information by receiving the advertisement information based on the BLE standards, but the configuration is not limited to this. For example, the information processing apparatus 101 may obtain the specific information by the GATT communication in a state in which the BLE connection with the communication apparatus 151 is already established. In addition, the specific information may be obtained on the basis of other communication standards since the standards are not limited to the BLE standards.

The respective processes executed by the information processing apparatus 101 according to the above-described exemplary embodiments may be executed by an OS (operating system) previously installed in the information processing apparatus 101 or an application program installed in the information processing apparatus 101.

The present invention can also be realized by processes in which a program for realizing one or more functions according to the above-described exemplary embodiments is supplied to a system or an apparatus via a network or various storage media, and a computer (such as a CPU or an MPU) of the system or the apparatus reads out and executes the program. The program may be executed by a single computer or may also be executed by a plurality of computers in conjunction with each other. It is not necessary to execute all the above-described processes by software, and part or all of the processes may be realized by hardware such as an application specific integrated circuit (ASIC). The configuration is not limited to a mode in which a single CPU performs all the processes, and a mode may be adopted in which a plurality of CPUs appropriately perform the processes in conjunction with each other. In addition, a mode may be adopted in which part of the above-described processes is executed by the single CPU, and the other processes are executed by the plurality of CPUs in conjunction with each other. Moreover, a mode may be adopted in which part of the above-described processes is executed by the single CPU, and the other processes are executed by the CPUs other than the single CPU.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228397 filed Nov. 24, 2016, which is hereby incorporated by reference herein in its entirety.

What is claimed is:

1. A control method for an information processing apparatus that executes a communication by a first communication method, executes a communication by a second communication method and belongs to a predetermined network constituted by a plurality of subnets, the control method comprising:
  receiving, from an external apparatus corresponding to an apparatus outside the information processing apparatus, specific information for specifying the external apparatus by the first communication method;
  accepting an instruction for searching for the external apparatus from a user;
  executing predetermined search processing based on the second communication method for searching for the external apparatus belonging to the same subnet as the subnet to which the information processing apparatus belongs, in a case where the instruction is accepted from the user;
  executing, after execution of the predetermined search processing, specified search processing, that is different from the predetermined search processing, based on the second communication method for searching for one or a plurality of external apparatuses by using the specific information received by the first communication method, wherein an external apparatus having transmitted the specific information and belonging to a subnet different from the subnet to which the information processing apparatus belongs among the plurality of subnets is discovered by the specified search processing;
  displaying a list for displaying information related to one or a plurality of the external apparatuses including the external apparatus discovered by the predetermined search processing and the external apparatus discovered by the specified search processing; and
  executing a communication with the external apparatus corresponding to information selected from the list by the second communication method,
  wherein the specified search processing using the specific information transmitted by the external apparatus discovered by the predetermined search processing is not executed in a case where the external apparatus corresponding to a transmission source of the specific information received before the instruction is accepted is discovered by the predetermined search processing.

2. The control method according to claim 1, wherein, in the specified search processing, the specific information received by the first communication method before the instruction is accepted is used.

3. The control method according to claim 1, wherein the specified search processing is executed plural times by using each of the plural pieces of specific information in a case where the instruction is accepted after the plural pieces of specific information are received.

4. The control method according to claim 1, further comprising:
  saving the received specific information in a memory,
  wherein the specified search processing is executed by using the specific information saved in the memory.

5. The control method according to claim 4, further comprising:
  updating, in a case where the external apparatus corresponding to a transmission source of the received specific information is the same as the external apparatus corresponding to a transmission source of the specific information already saved in the memory, the specific information already saved in the memory to the received specific information.

6. The control method according to claim 1, wherein the specified search processing is not executed in a case where the specific information received before the instruction is accepted does not exist.

7. The control method according to claim 1, wherein the specified search processing is processing for searching for an apparatus that can execute printing.

8. The control method according to claim 2, wherein the predetermined search processing is processing for searching for an apparatus that can execute printing.

9. The control method according to claim 1, wherein a print job for causing the external apparatus to execute printing is transmitted to the external apparatus corresponding to information selected from the list by the second communication method.

10. The control method according to claim 1, wherein the first communication method is Bluetooth Low Energy (registered trademark).

11. The control method according to claim 1, wherein the second communication method is Wi-Fi (registered trademark).

12. The control method according to claim 2, wherein the predetermined search processing is multicast search processing or broadcast search processing.

13. The control method according to claim 1, wherein the specified search processing is unicast search processing.

14. The control method according to claim 1, wherein the specific information is an IP address of the external apparatus corresponding to a transmission source of the specific information.

15. An information processing apparatus that executes a communication by a first communication method, executes a communication by a second communication method and belongs to a predetermined network constituted by a plurality of subnets, the information processing apparatus comprising:

at least one processor configured to control:
a reception unit configured to receive, from an external apparatus corresponding to an apparatus outside the information processing apparatus, specific information for specifying the external apparatus by the first communication method;
an acceptance unit configured to accept an instruction for searching for the external apparatus from a user;
a search unit configured to execute, predetermined search processing based on the second communication method for searching for the external apparatus belonging to the same subnet as the subnet to which the information processing apparatus belongs, in a case where the instruction is accepted from the user and, after execution of the predetermined search processing, executing, executing specified search processing based on the second communication method for searching for one or a plurality of external apparatuses by using the specific information received by the first communication method, wherein an external apparatus having transmitted the specific information and belonging to a subnet different from the subnet to which the information processing apparatus belongs among the plurality of subnets is discovered by the specified search processing;
a display unit configured to display a list for displaying information related to one or a plurality of the external apparatuses including the external apparatus discovered by the predetermined search processing and the external apparatus discovered by the specified search processing; and
a communication unit configured to execute a communication with the external apparatus corresponding to information selected from the list by the second communication method,
wherein the specified search processing using the specific information transmitted by the external apparatus discovered by the predetermined search processing is not executed in a case where the external apparatus corresponding to a transmission source of the specific information received before the instruction is accepted is discovered by the predetermined search processing.

16. A non-transitory computer-readable storage medium storing a program for causing a computer of an information processing apparatus that executes a communication by a first communication method, executes a communication by a second communication method and belongs to a predetermined network constituted by a plurality of subnets to execute:

receiving, from an external apparatus corresponding to an apparatus outside the information processing apparatus, specific information for specifying the external apparatus by the first communication method;
accepting an instruction for searching for the external apparatus from a user;
executing predetermined search processing based on the second communication method for searching for the external apparatus belonging to the same subnet as the subnet to which the information processing apparatus belongs, in a case where the instruction is accepted from the user;
executing, after execution of the predetermined search processing, specified search processing, that is different from the predetermined search processing, based on the second communication method for searching for one or a plurality of external apparatuses by using the specific information received by the first communication method, wherein an external apparatus having transmitted the specific information and belonging to a subnet different from the subnet to which the information processing apparatus belongs among the plurality of subnets is discovered by the specified search processing;
displaying a list for displaying information related to one or a plurality of the external apparatuses including the external apparatus discovered by the predetermined search processing and the external apparatus discovered by the specified search processing; and
executing a communication with the external apparatus corresponding to information selected from the list by the second communication method,
wherein the specified search processing using the specific information transmitted by the external apparatus discovered by the predetermined search processing is not executed in a case where the external apparatus corresponding to a transmission source of the specific information received before the instruction is accepted is discovered by the predetermined search processing.

* * * * *